US007228421B1

(12) United States Patent
Huang et al.

(10) Patent No.: US 7,228,421 B1
(45) Date of Patent: Jun. 5, 2007

(54) TECHNIQUE FOR GENERATING CONTROL MESSAGES WITH REASON INFORMATION BETWEEN NODES IN A DATA NETWORK

(75) Inventors: Geoffrey Huang, Mountain View, CA (US); Jan Vilhuber, San Luis Obispo, CA (US)

(73) Assignee: Cisco Technology, Inc., San Jose, CA (US)

( * ) Notice: Subject to any disclaimer, the term of this patent is extended or adjusted under 35 U.S.C. 154(b) by 681 days.

(21) Appl. No.: 09/894,115

(22) Filed: Jun. 27, 2001

(51) Int. Cl.
*H04L 9/00* (2006.01)

(52) U.S. Cl. .................. 713/171; 380/277; 380/278

(58) Field of Classification Search ........ 709/223–224, 709/227–229; 714/1, 43, 51, 55; 713/153, 713/171, 168, 150, 152, 160
See application file for complete search history.

(56) References Cited

U.S. PATENT DOCUMENTS

| 5,166,979 | A | * | 11/1992 | Takayama et al. ............ 726/19 |
| 5,167,035 | A | * | 11/1992 | Mann et al. ................... 714/4 |
| 5,202,989 | A | * | 4/1993 | Hirosawa et al. ........... 718/105 |
| 5,210,869 | A | * | 5/1993 | Williams ..................... 714/48 |
| 5,325,419 | A | * | 6/1994 | Connolly et al. ......... 455/435.1 |
| 5,572,518 | A | * | 11/1996 | Takama et al. ............. 370/385 |
| 5,787,177 | A | * | 7/1998 | Leppek ....................... 713/164 |
| 5,974,149 | A | * | 10/1999 | Leppek ....................... 713/164 |
| 6,038,307 | A | * | 3/2000 | Fahrer et al. .......... 379/209.01 |
| 6,189,104 | B1 | * | 2/2001 | Leppek ....................... 713/201 |
| 6,347,334 | B1 | * | 2/2002 | Fredericks et al. ......... 709/220 |
| 6,418,205 | B2 | * | 7/2002 | Capers et al. .......... 379/112.01 |
| 6,651,189 | B1 | * | 11/2003 | Jeon et al. .................... 714/43 |
| 6,701,439 | B1 | * | 3/2004 | Dunn ......................... 380/255 |
| 6,760,444 | B1 | * | 7/2004 | Leung ......................... 380/270 |
| 6,839,356 | B2 | * | 1/2005 | Barany et al. .............. 370/401 |
| 2001/0043577 | A1 | * | 11/2001 | Barany et al. .............. 370/328 |
| 2002/0026575 | A1 | * | 2/2002 | Wheeler et al. ............ 713/156 |
| 2002/0075807 | A1 | * | 6/2002 | Troxel et al. ............... 370/238 |
| 2002/0133727 | A1 | * | 9/2002 | Dervin et al. ............... 713/310 |

(Continued)

OTHER PUBLICATIONS

D. Piper, et al, "The Internet IP Security Domain of Interpretation for ISAKMP)," Network Working Group 2407, Nov. 1998, 32 pages.

(Continued)

*Primary Examiner*—Nasser Moazzami
*Assistant Examiner*—David Garcia Cervetti
(74) *Attorney, Agent, or Firm*—Beyer Weaver, LLP; Dean E. Wolf, Esq.

(57) ABSTRACT

A technique is disclosed for generating control messages to be transmitted from a first network device to a second network device in a data network. A first control message to be generated at the first network device is determined. Reason information relating to at least one reason for generating the first control message is identified. The first control message is then generated at the first network device, and included the identified reason information. The first control message may be transmitted to at least one other network device in the network, including the second network device. When the first control message is received at the second network device, the reason information included in the first control message is identified. An appropriate response, based, at least in part, upon the reason information provided in the first control message, may then be determined and implemented at the second network device.

47 Claims, 4 Drawing Sheets

U.S. PATENT DOCUMENTS

2004/0064688 A1* 4/2004 Jacobs ........................ 713/150

OTHER PUBLICATIONS

Maughan, et al, "*Internet Security Association and key management protocol (ISAKMP)*," Network Working Group, RFC 2408, Nov. 1998, pp. 1-86.

Harkins, et al, "*The Internet Key Exchange*", Netwaork Working Group, RFC 2409, Nov. 1998, pp. 1-44.

Kent et al, "*Security Architecture for the Internet Protocol*", Network Working Group, RFC 2401, Nov. 1998, pp. 1-66.

* cited by examiner

TECHNIQUE FOR GENERATING CONTROL MESSAGES WITH REASON INFORMATION BETWEEN NODES IN A DATA NETWORK

BACKGROUND OF THE INVENTION

1. Field of the Invention

The present invention relates generally to data networks, and more specifically to a technique for generating control messages with reason information between nodes in a data network.

2. Description of Related Arts

Network communication protocols have become increasingly sophisticated over the past few years. One particular area concerning communication protocols which has received much attention relates to the field of network security. This is particularly evident in global communication networks such as the Internet. For example, a number of standardized security-related protocols and/or definitions have been established for achieving acceptable levels of security over the Internet. Such standardized protocols include, for example, Internet Key Exchange (IKE) protocol, IP Security (IPSec) protocol, Internet Security Association Key Management Protocol (ISAKMP), etc. The Internet Key Exchange protocol is defined in RFC 2409, the IP Security protocol is defined in RFC 2401, and the Internet Security Association Key Management Protocol is defined in RFC 2408. Each of these documents is incorporation herein by reference in its entirety for all purposes.

As commonly known to one having ordinary skill in the art, implementation of Internet Security Protocols (such as those described above) between nodes in an IP network involves the establishment of different types of Security Associations (SAs) for providing secure communication of traffic between network nodes. Conventionally, every Security Association (SA) has a unique ID which serves as a mechanism for generating keying materials for purposes of allowing encrypted communication between network nodes. According to the conventional IKE protocol, different types of SAs may be used for communicating different types of information between two network nodes.

Typically, in order to pass encrypted traffic between two network nodes, an IKE SA (commonly referred to as a "Phase 1" SA) is first established between the network nodes. The Phase 1 SA is typically used to pass control signal information between the network nodes. Such a control information may include, for example, keep alive or heartbeat messages.

After the Phase 1 SA has been established, one or more IPSec SAs (commonly referred to as "Phase 2" SAs) may be established for allowing encrypted data to be passed between the network nodes. According to conventional practice, a Phase 1 SA may be used to initiate one or more Phase 2 SAs. Typically, Phase 1 SAs are initiated between network nodes for allowing control messages to be exchanged between the nodes, whereas Phase 2 SAs are used for allowing packets and/or encrypted IP data to be exchanged between the nodes.

According to conventional IP security techniques, a Phase 2 SA can only be initiated after its associated Phase 1 SA has been established. However, the expiration of Phase 1 and Phase 2 SAs may occur independently from one another. Thus, it is possible for one or more Phase 2 SAs to continue after the expiration of their associated Phase 1 SAs.

In many conventional IP networks, IKE keep-alive messages are typically used for dead-peer detection and consequent fail-over implementation. According to conventional practice, once the Phase 1 SA expires, the negotiated keep-alive control messages will also expire. Consequently, it is typically the case that two IPSec peers will exchange no further keep-alive messages until the Phase 1 SA renegotiates, either by renegotiating the Phase 2 SA, or by user intervention. Thus it will be appreciated that there exists a period of time between the expiration of the Phase 1 SA and the expiration/renegotiation of the Phase 2 SA where no keep-alive or heartbeat messages are transmitted between the two peers. As a result, any fail-over mechanisms between the two peers will be disabled during this time.

Typically, when a Phase 1 SA expires, the router which originally initiated the Phase 1 SA will check to see whether the expiring Phase 1 SA is related to any active Phase 2 SAs. If any active Phase 2 SAs are identified, the router will initiate a Phase 1 renegotiation. This process may continue until all the associated Phase 2 SAs have expired. If no associated Phase 2 SAs are identified, then it may be assumed that no traffic is flowing between the router and its peer. Accordingly, the router will allow the Phase 1 SA to time out, and as a consequence, the keep-alive messages will also time out.

It will be appreciated that situations may arise in which it is desired to delete a selected Phase 1 SA without deleting related Phase 2 SAs. For example, a system administrator may wish to manually clear the Phase 1 SA. Alternatively, an error relating to the Phase 1 SA may be detected and, in response, automatic or manual deletion of the Phase 1 SA may be initiated. However, according to the conventional IKE and IPSec protocols, the deletion of any given Phase 1 SA having active, associated Phase 2 SAs will result in the Phase 1 renegotiation. Thus, according to conventional techniques, even if it is desired to delete a selected Phase 1 SA, the existence of any related, active Phase 2 SA will result in the Phase 1 SA continuously renegotiating itself. Accordingly, it will be appreciated that there exists a general desire to improve upon security communication protocols implemented in IP networks.

SUMMARY OF THE INVENTION

According to various embodiments of the present invention, methods, computer program products, and systems are disclosed for generating control messages to be transmitted from a first network device to a second network device in a data network, According to a specific embodiment, the control messages may relate to actions to be performed at the second network device. A first control message to be generated at the first network device is determined. Reason information relating to at least one reason for generating the first control message is identified. The first control message is then generated at the first network device. According to a specific embodiment, the first control message may include the identified reason information. Thereafter, the first control message may be transmitted to at least one other network device in the network, including the second network device.

When the first control message is received at the second network device, the reason information included in the first control message may be identified. An appropriate response to the first control message may then be determined and implemented at the second network device. According to a specific embodiment, the appropriate response by the second network node may be based, at least in part, upon the reason information provided in the first control message. By including additional information relating to a reason for the generation of a control message, an improved data network may be implemented which has the advantage of smarter processing and/or responding to the modified control messages.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENTS

According to specific embodiments of the present invention, modified control messages may be exchanged between network devices, wherein the modified control messages include additional information relating to at least one reason for implementing actions specified by the control message. By including the additional explanation or reason information with the control message, the receiving network device is able to use the additional reason information to more appropriately respond to the received control message.

For example, according to a specific embodiment of the present invention, a standard ISAKMP defined "Delete Payload" control message may be modified to include a "reason" or "explanation" field, for storing information (such as, for example, one or more codes) relating to the reason why the Delete Payload message was generated. The additional reason information within the modified Delete Payload control message may be used to facilitate communication between the IPSec peer device(s). Moreover, by including additional reason information in the modified Delete Payload control message which explains why the control message was generated, the receiving IPSec peer device(s) may use this information to more appropriately respond to the Delete Control message.

For example, the receiving peer device may use the reason information to display a warning message, attempt a recovery, or take other appropriate action. More specifically, according to a specific embodiment, if the reason for the deletion of a Phase 1 SA is related to its expired lifetime, and at least one associated Phase 2 SA is still active, an attempt may be made to renegotiate the Phase 1 SA. However, if the reason for deleting the Phase 1 SA relates to a user initiated manual delete operation, each peer device may proceed with deleting the specified Phase 1 SA, even during times when active Phase 2 SAs associated with the Phase 1 SA have been identified.

Thus, for example, a user may desire to terminate a selected Phase 1 SA and prevent the keep-alive protocol from attempting to renegotiate the terminated SA. According to a specific embodiment of the present invention, the user may issue a Delete_With_Reason command message to clear the Phase 1 SA which has been established between two peers for implementing a keep-alive message protocol. The additional reason information in the Delete_With_Reason command message may specify that the Delete_With_Reason command message was manually initiated by the user. According to one implementation, the Delete_With_Reason command message may be issued from either the initiator end point or the responder end point.

Once this Delete_With_Reason command message has been issued, the two endpoints may then utilize the reason information to terminate the specified Phase 1 SA without attempting to renegotiate it. Thus, the keep-alive message protocol between the two nodes will effectively be disabled. According to a specific implementation, it is preferred to send keep-alive control messages using Phase 1 SAs for scalability purposes.

Additionally, according to a specific embodiment, if the user terminates the Phase 1 SA while associated Phase 2 SAs are still active, each peer device may be configured to use the reason information to initiate an action whereby a warning message may be displayed at either or both of the IPSec endpoints. According to a specific embodiment, the warning message does not necessarily signal an error. Rather, the display of a warning message may be implemented as preferred course of action to be taken in this specific situation.

According to a specific embodiment, a standardized set of values or codes may be used to define a plurality of different reasons relating to a specified action. In a specific implementation where the action is a Delete_With_Reason control message, a plurality of pre-defined reasons or reason codes may be defined for the associated action such as, for example, "no reason", "error", "user initiated", "expired lifetime", "no error", etc.

It will be appreciated that the technique of the present invention may be modified by one having ordinary skill in the art to be adapted to any type of control message in order to add additional information to the control message for explaining one or more associated reasons for implementing the action(s) relating to the control message. Moreover, such a modified control message may be applied in a variety of communication protocols such as, for example, HTTP, TCP, FTP, etc. By including additional information relating to a reason for the generation of the control message, an improved data network may be implemented which has the advantage of smarter processing and/or responding to the modified control messages.

Figure 1:
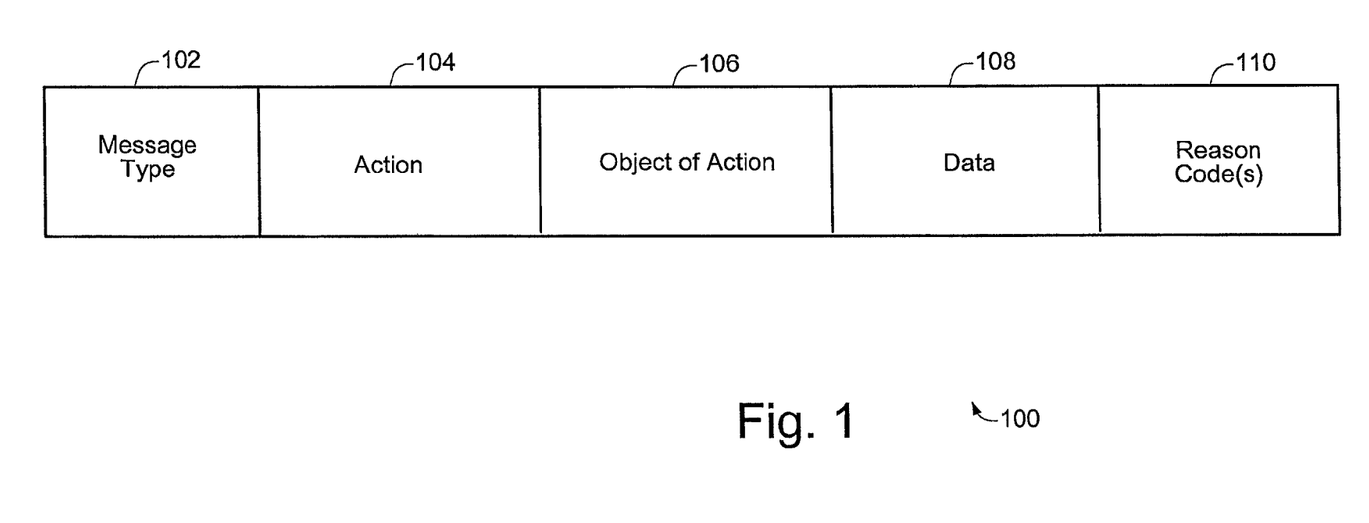
FIG. 1 shows an example of a modified control message in accordance with a specific embodiment of the present invention.

FIG. 1 shows an example of a modified control message in accordance with a specific embodiment of the present invention. As shown in the example of FIG. 1, the modified control message 100 may include one or more of the following fields: a first field 102 for specifying a particular message type (e.g. keep-alive message, control message, etc.); a second field 104 for specifying particular action(s) (e.g. add, delete, modify, etc.) to be taken; a third field 106 for specifying the identity of the object or entity upon which the action is to be taken (e.g. a specific SA); a data field 108 for specifying any desired data relating to the action; a reason field 110 which includes information relating to at least one reason or explanation for the generation of the modified control message. In a specific embodiment, the reason field 110 may be configured to be 8 bits in length, meaning that up to 256 reasons may be defined.

It will be appreciated that one or more of the fields described above with respect to message 100 may be omitted or combined or otherwise modified by one having ordinary skill in the art. For example, a Delete_With_Reason control message may be implemented in which fields 102 and 104 are combined or implied, and in which data field 108 is omitted.

According to specific embodiments of the present invention, the modified control messages such as, for example, the Delete_With_Reason message, may not be compatible with conventional security protocols. In such situations, it may be preferable to update existing software at selected nodes in order to allow such nodes to properly interpret the modified control message of the present invention.

Figure 2:
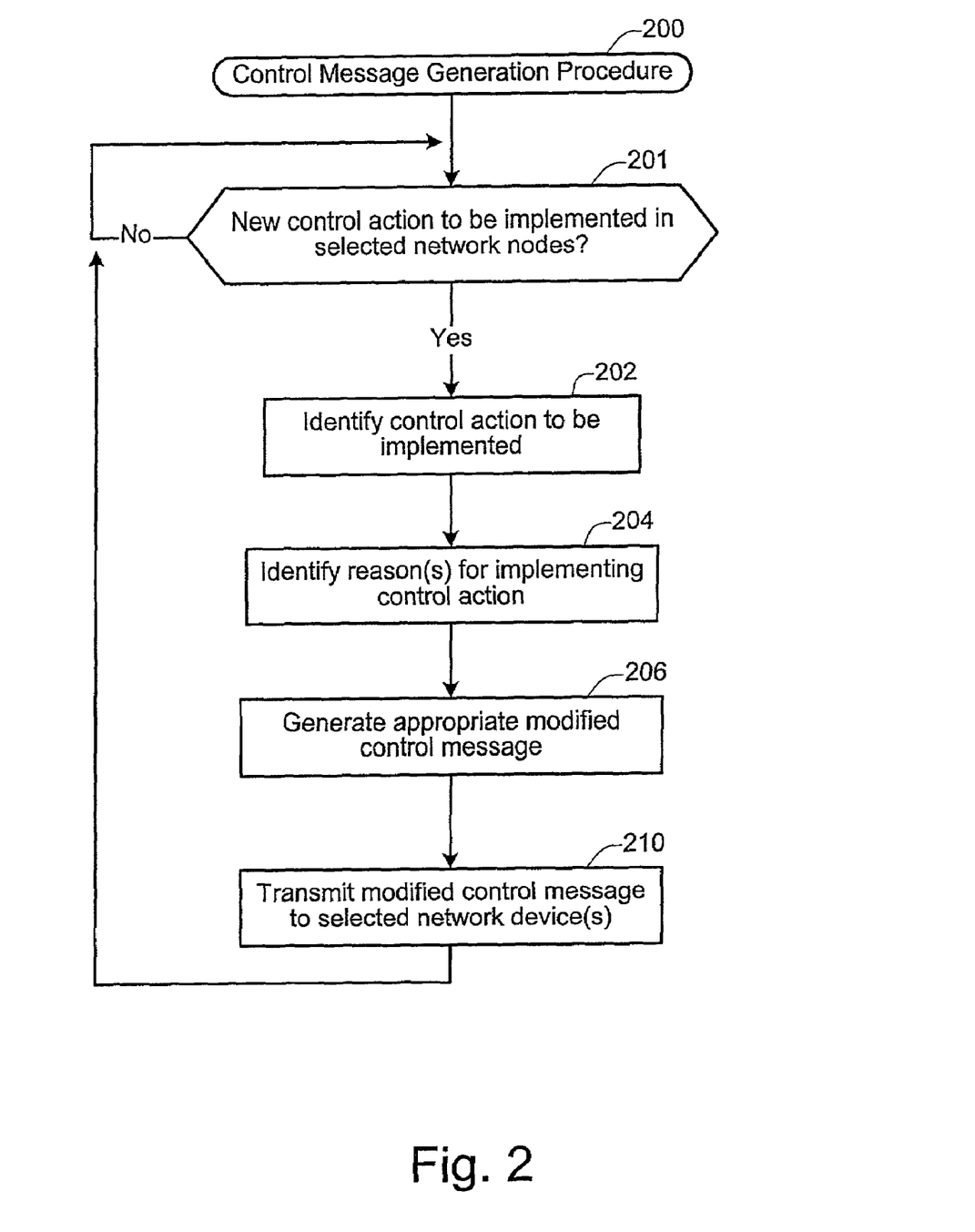
FIG. 2 shows a flow diagram of a Control Message Generation Procedure 200 in accordance with a specific embodiment of the present invention.

FIG. 2 shows a flow diagram of a Control Message Generation Procedure 200 which may be implemented, for example, at an initiating node for peer network device. According to specific embodiments, an initiating node represents a node which has initiated a Phase 1 or Phase 2 SA.

As shown at 201 of FIG. 2, the Control Message Generation Procedure may be triggered in response to determining that a new control action is to be initiated at a first network device. The control action to be performed is then identified (202). Additionally, information relating to the reason(s) for generating the identified control action may also be identified (204), if available. Such reason information may indicate, for example, that the control action was manually generated (e.g. user initiated), that the control action was automatically generated because of a specific reason (e.g. expired lifetime), that the control action relates to redundancy information (e.g. state information, etc.) shared between redundancy or peer devices, etc. Thereafter, the first network device may generate (206) an appropriate modified control message, which may then be transmitted (210) to one or more selected network devices.

Figure 3:
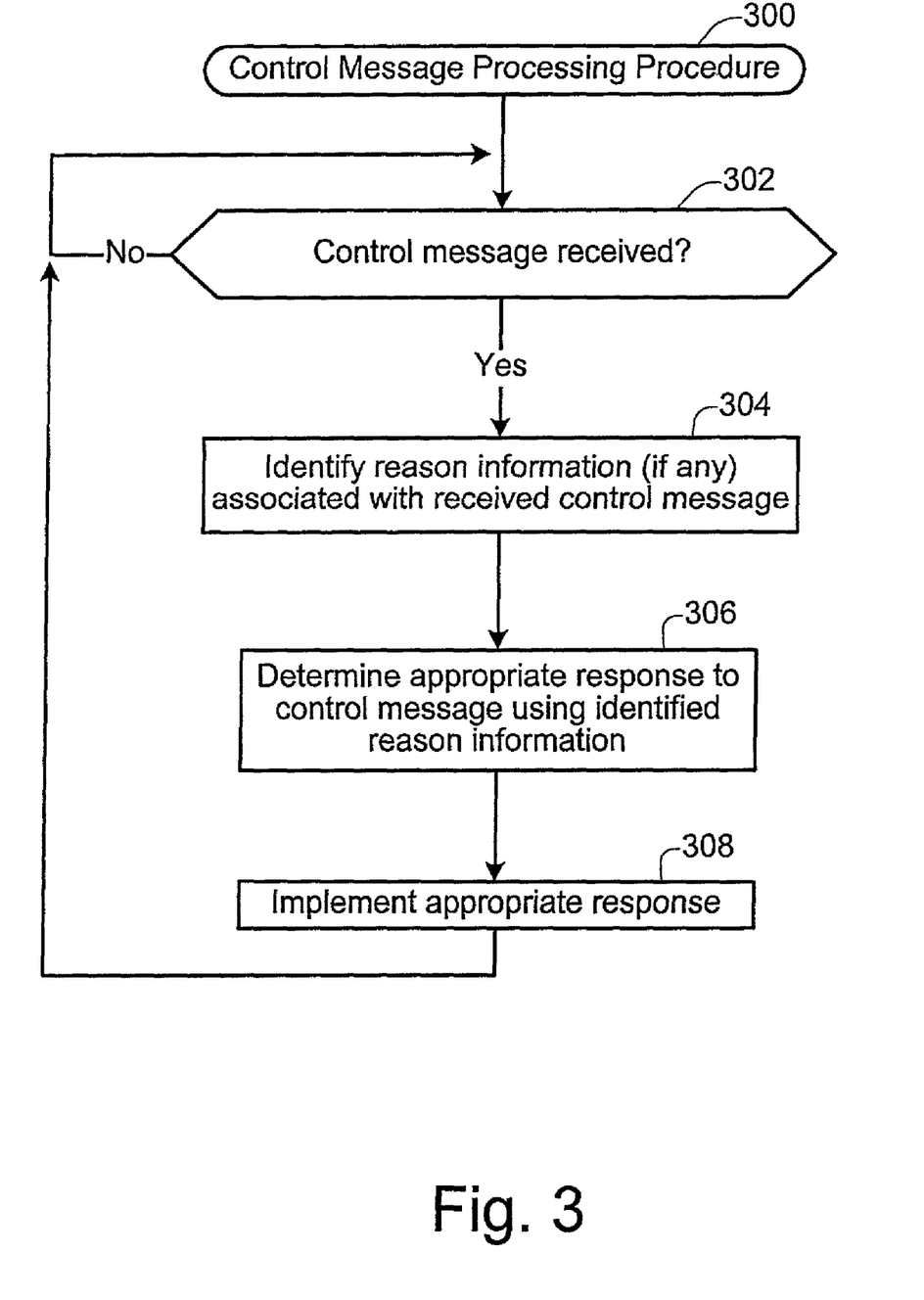
FIG. 3 shows an example of a Control Message Processing Procedure 300 in accordance with a specific embodiment of the present invention.

FIG. 3 shows an example of a Control Message Processing Procedure 300 in accordance with a specific embodiment of the present invention. In one embodiment, the procedure 300 may be implemented at a network device which receives the modified control message described, for example, in FIG. 1 of the drawings. As shown at 302 of FIG. 3, the Control Message Processing Procedure may be triggered in response to receiving a new control message at the receiving network device. The modified control message is then analyzed (304) in order to extract appropriate information from the control message, including reason information (if any) which may be identified in the reason field of the modified control message. Using the control message information, the network device may then determine (306) and implement (308) an appropriate response to the control message. As described previously, the appropriate response by the network node may be based, at least in part, upon the information retrieved from the reason field of the modified control message.

Generally, the modified control message technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the modified control message technique of this invention may be implemented on a general-purpose programmable machine selectively activated or reconfigured by a computer program stored in memory. Such programmable machine may be a network device designed to handle network traffic, such as, for example, a router or a switch. Such network devices may have multiple network interfaces including ATM, frame relay, IP, and ISDN interfaces, for example. Specific examples of such network devices include routers and switches, such as, for example, specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the modified control message technique of this invention may be implemented on a general-purpose network host machine such as a personal computer or workstation. Further, the invention may be at least partially implemented on a card (e.g., an interface card) for a network device or a general-purpose computing device.

Figure 4:
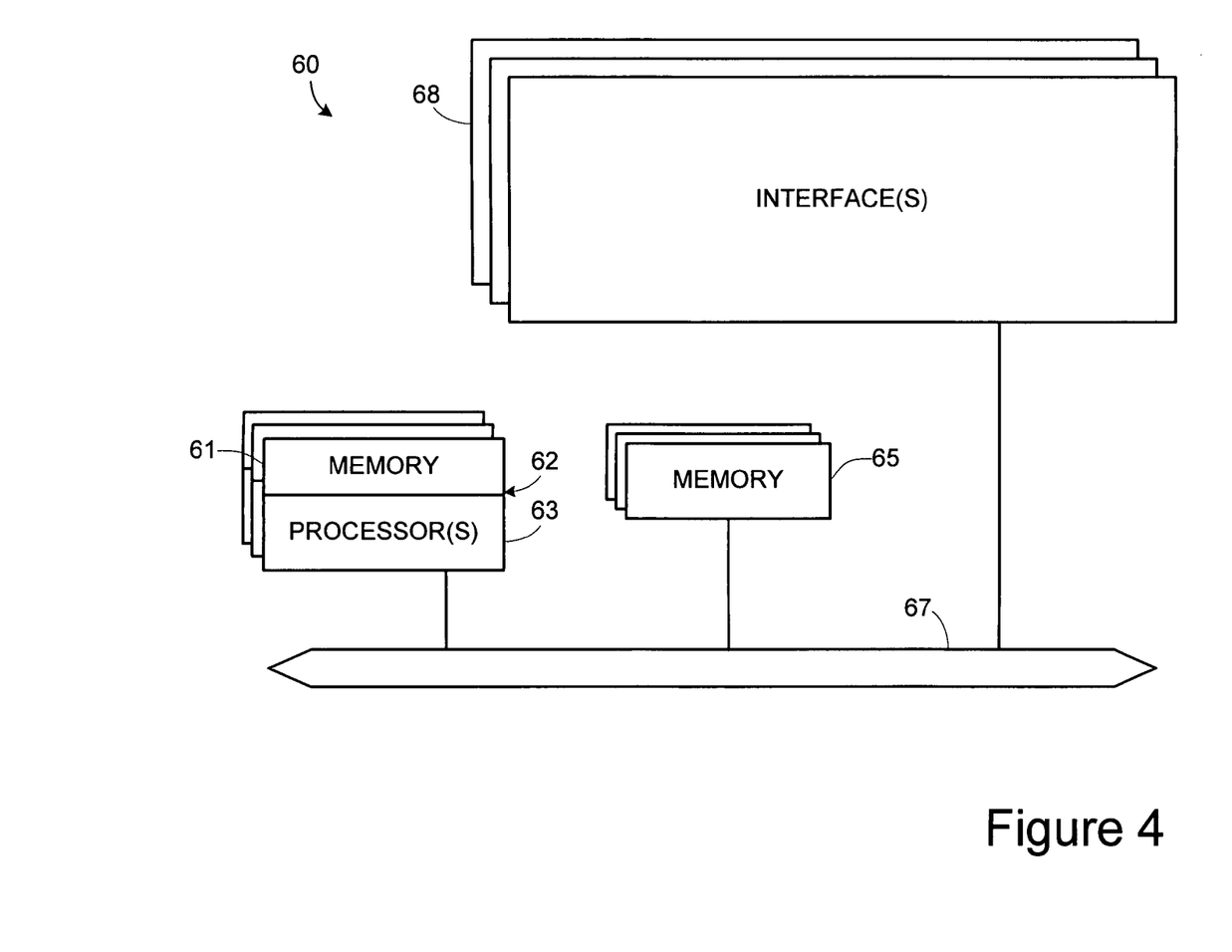
FIG. 4 shows a network device 60 suitable for implementing various aspects of the present invention.

Referring now to FIG. 4, a network device 60 suitable for implementing the modified control message techniques of the present invention includes a master central processing unit (CPU) 62, interfaces 68, and at least one bus 67 (e.g., a PCI bus). When acting under the control of appropriate software or firmware, the CPU 62 may be responsible for implementing specific functions associated with the functions of a desired network device. For example, when configured as a traffic handling device, the CPU 62 may be responsible for analyzing packets, encapsulating packets, forwarding packets to appropriate network devices, generating control messages, etc. The CPU 62 preferably accomplishes all these functions under the control of software including an operating system (e.g. Windows NT), and any appropriate applications software.

CPU 62 may include one or more processors 63 such as a processor from the Motorola family of microprocessors or the MIPS (million instructions per second) family of microprocessors. In an alternative embodiment, processor 63 is specially designed hardware for controlling the operations of network device 60. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the network device 60. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI (High-Speed Serial Interface) interfaces, POS (Point of Sale) interfaces, FDDI (Fiber Distributed Data Interface) interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 4 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 65) configured to store data, program instructions for the general-purpose network operations and/or other information relating to the functionality of the modified control message techniques described herein. The program instructions may control the operation of an operating system and/or one or more applications, for example. The memory or memories may also be configured to include one or more data structures for storing codes or other information relating to pre-defined reasons for generating specific control messages, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

The invention claimed is:

1. A method for generating a control message to be transmitted from a first network device to a second network device in a data network, the control message relating to an action to be performed at the second network device, the method comprising:
   determining a first control message to be generated, wherein the first control message corresponds to a security protocol control message;
   identifying reason information relating to at least one reason for generating the first control message; and
   generating the first control message, wherein the first control message includes explicit reason information relating to the identified at least one reason for generating the control message;
   wherein the reason information includes at least one reason selected from a group of reasons consisting of: a user initiated reason, an expired lifetime reason, and a no error reason;
   wherein the first control message includes a first payload selected from a group consisting of: a security association payload and a delete payload;
   wherein the first payload includes the reason information.

2. The method of claim 1 wherein the first control message is formatted in accordance with an Internet Key Exchange protocol.

3. The method of claim 1 wherein the first control message is formatted in accordance with an Internet Security Association Key Management Protocol.

4. The method of claim 1 wherein the first control message corresponds to a control message used for modifying a security association.

5. The method of claim 1 further comprising transmitting the first control message to the second network device to thereby cause the second network device to implement an appropriate action in response to the first control message.

6. The method of claim 1:
   wherein the security association payload is adapted to facilitate negotiation of a security association between a first network node and a second network node; and
   wherein the delete payload is adapted to facilitate deletion of a security association associated with a first network node and a second network node.

7. A method for communicating between nodes in a data network, the method comprising:
   receiving a first control message from a first node, the first control message corresponding to a security protocol control message, the first control message including explicit reason information relating to at least one reason for the generation of the first control message, the first control message including a first payload, the reason information being included in the first payload, the first payload being selected from a group consisting of: a security association payload and a delete payload, the reason information including at least one reason selected from a group of reasons consisting of: a user initiated reason, an expired lifetime reason, and a no error reason;
   identifying the reason information;
   determining an appropriate response to the first control message using at least said reason information; and
   implementing said appropriate response.

8. The method of claim 7 wherein the first control message is formatted in accordance with an Internet Key Exchange protocol.

9. The method of claim 7 wherein the first control message is formatted in accordance with an Internet Security Association Key Management Protocol.

10. The method of claim 7 wherein the first control message corresponds to a control message used for modifying a security association.

11. The method of claim 7 further comprising:
    implementing a first response to the first control message if the reason information includes a first reason code; and
    implementing a second response to the control message if the reason information includes a second reason code.

12. The method of claim 7 wherein the control message relates to an action to be performed at a network device receiving the control message.

13. The method of claim 7:
    wherein the security association payload is adapted to facilitate negotiation of a security association between a first network node and a second network node; and
    wherein the delete payload is adapted to facilitate deletion of a security association associated with a first network node and a second network node.

14. A computer program product for generating a control message to be transmitted from a first network device to a second network device in a data network, the control message relating to an action to be performed at the second network device, the computer program product comprising:

a computer usable medium having computer readable code embodied therein, the computer readable code comprising:

computer code for determining a first control message to be generated, wherein the first control message corresponds to a security protocol control message;

computer code for identifying reason information relating to at least one reason for generating the first control message; and computer code for generating the first control message, wherein the first control message includes explicit reason information relating to the identified at least one reason for generating the control message;

wherein the reason information includes at least one reason selected from a group of reasons consisting of: a user initiated reason, an expired lifetime reason, and a no error reason;

wherein the first control message includes a first payload selected from a group consisting of: a security association payload and a delete payload;

wherein the first payload includes the reason information.

15. The computer program product of claim 14 is formatted in accordance with an Internet Key Exchange protocol.

16. The computer program product of claim 14 wherein the first control message is formatted in accordance with an Internet Security Association Key Management Protocol.

17. The computer program product of claim 14 wherein the first control message corresponds to a control message used for modifying a security association.

18. The computer program product of claim 14:

wherein the security association payload is adapted to facilitate negotiation of a security association between a first network node and a second network node; and wherein the delete payload is adapted to facilitate deletion of a security association associated with a first network node and a second network node.

19. A computer program product for communicating between nodes in a data network, the computer program product comprising:

a computer usable medium having computer readable code embodied therein, the computer readable code comprising:

computer code for receiving a first control message from a first node, the first control message corresponding to a security protocol control message, the first control message including explicit reason information relating to at least one reason for the generation of the first control message, the first control message including a first payload, the first payload including the reason information, the first payload being selected from a group consisting of: a security association payload and a delete payload;

computer code for identifying the reason information, the reason information including at least one reason selected from a group of reasons consisting of: a user initiated reason, an expired lifetime reason, and a no error reason;

computer code for determining an appropriate response to the first control message using at least said reason information; and computer code for implementing said appropriate response.

20. The computer program product of claim 19 wherein the first control message is formatted in accordance with an Internet Key Exchange protocol.

21. The computer program product of claim 19 wherein the first control message is formatted in accordance with an Internet Security Association Key Management Protocol.

22. The computer program product of claim 19 wherein the first control message corresponds to a control message used for modifying a security association.

23. The computer program product of claim 19 further comprising:

computer code for implementing a first response to the first control message if the reason information includes a first reason code; and computer code for implementing a second response to the control message if the reason information includes a second reason code.

24. The computer program product of claim 19 wherein the control message relates to an action to be performed at a network device receiving the control message.

25. The computer program product of claim 19:

wherein the security association payload is adapted to facilitate negotiation of a security association between a first network node and a second network node; and wherein the delete payload is adapted to facilitate deletion of a security association associated with a first network node and a second network node.

26. A system for communicating between nodes in a data network, the system comprising:

means for receiving a first control message from a first node, the first control message corresponding to a security protocol control message, the first control message including explicit reason information relating to at least one reason for the generation of the first control message, the reason information including at least one reason selected from a group of reasons consisting of: a user initiated reason, an expired lifetime reason, and a no error reason;

means for identifying the reason information;

means for determining an appropriate response to the first control message using at least said reason information; and means for implementing said appropriate response;

wherein the first control message includes a first payload selected from a group consisting of: a security association payload and a delete payload;

wherein the first payload includes the reason information.

27. The system of claim 26 wherein the first control message is formatted in accordance with an Internet Key Exchange protocol.

28. The system of claim 26 wherein the first control message is formatted in accordance with an Internet Security Association Key Management Protocol.

29. The system of claim 26 wherein the first control message corresponds to a control message used for modifying a security association.

30. The system of claim 26 further comprising means for transmitting the first control message to the second network device to thereby cause the second network device to implement an appropriate action in response to the first control message.

31. The system of claim 26 further comprising:

means for implementing a first response to the first control message if the reason information includes a first reason code; and means for implementing a second response to the control message if the reason information includes a second reason code.

32. The system of claim 26 wherein the control message relates to an action to be performed at a network device receiving the control message.

33. The system of claim 26:
wherein the security association payload is adapted to facilitate negotiation of a security association between a first network node and a second network node; and
wherein the delete payload is adapted to facilitate deletion of a security association associated with a first network node and a second network node.

34. A system for generating a control message to be transmitted to a network device in a data network, the control message relating to an action to be performed at the network device, the system comprising:
at least one CPU;
memory; and
at least one interface for communication with the network device;
the system being configured or designed to determine a first control message to be generated, wherein the first control message corresponds to a security protocol control message;
the system being further configured or designed to identify reason information relating to at least one reason for generating the first control message; and
the system being further configured or designed to generate the first control message, wherein the first control message includes explicit reason information relating to the identified at least one reason for generating the control message;
wherein the reason information includes at least one reason selected from a group of reasons consisting of: a user initiated reason, an expired lifetime reason, and a no error reason;
wherein the first control message includes a first payload selected from a group consisting of: a security association payload and a delete payload;
wherein the first payload includes the reason information.

35. The system of claim 34 wherein the first control message is formatted in accordance with an Internet Key Exchange protocol.

36. The system of claim 34 wherein the first control message is formatted in accordance with an Internet Security Association Key Management Protocol.

37. The system of claim 34 wherein the first control message corresponds to a control message used for modifying a security association.

38. The system of claim 34 being further configured or designed to transmit the first control message to a second network device to thereby cause the second network device to implement an appropriate action in response to the first control message.

39. The system of claim 34:
wherein the security association payload is adapted to facilitate negotiation of a security association between a first network node and a second network node; and
wherein the delete payload is adapted to facilitate deletion of a security association associated with a first network node and a second network node.

40. A system for communicating between nodes in a data network, the system comprising:
at least one CPU;
memory, and
at least one interface for communicating with at least one network device, wherein the first control message corresponds to a security protocol control message;
the system being configured or designed to receive a first control message from a first node, the first control message corresponding to a security protocol control message, the first control message including explicit reason information relating to at least one reason for the generation of the first control message, the first control message including a first payload, the first payload including the reason information, the first payload being selected from a group consisting of: a security association payload and a delete payload, wherein the first payload includes the reason information, the reason information including at least one reason selected from a group of reasons consisting of: a user initiated reason, an expired lifetime reason, and a no error reason;
the system being further configured or designed to identify the reason information;
the system being further configured or designed to determine an appropriate response to the first control message using at least said reason information; and
the system being further configured or designed to implement said appropriate response.

41. The system of claim 40 wherein the first control message is formatted in accordance with an Internet Key Exchange protocol.

42. The system of claim 40 wherein the first control message is formatted in accordance with an Internet Security Association Key Management Protocol.

43. The system of claim 40 wherein the first control message corresponds to a control message used for modifying a security association.

44. The system of claim 40 further comprising:
the system being further configured or designed to implement a first response to the first control message if the reason information includes a first reason code; and
the system being further configured or designed to implement a second response to the control message if the reason information includes a second reason code.

45. The system of claim 40:
wherein the security association payload is adapted to facilitate negotiation of a security association between a first network node and a second network node; and
wherein the delete payload is adapted to facilitate deletion of a security association associated with a first network node and a second network node.

46. A method for generating a control message to be transmitted from a first network device to a second network device in a data network, the control message relating to an action to be performed at the second network device, the method comprising:
determining a first control message to be generated, wherein the first control message corresponds to a security protocol control message;
identifying reason information relating to at least one reason for generating the first control message; and
generating the first control message, wherein the first control message includes explicit reason information relating to the identified at least one reason for generating the control message;
wherein the reason information includes at least one reason selected from a group of reasons consisting of: a user initiated reason, an expired lifetime reason, and a no error reason;
wherein the first control message includes a first payload which includes the reason information.

47. A system for generating a control message to be transmitted to a network device in a data network, the control message relating to an action to be performed at the network device, the system comprising:
- at least one CPU;
- memory; and
- at least one interface for communicating with the network device;
- the system being configured or designed to determine a first control message to be generated, wherein the first control message corresponds to a security protocol control message;
- the system being further configured or designed to identify reason information relating to at least one reason for generating the first control message; and
- the system being further configured or designed to generate the first control message, wherein the first control message includes explicit reason information relating to the identified at least one reason for generating the control message;
- wherein the reason information includes at least one reason selected from a group of reasons consisting of: a user initiated reason, an expired lifetime reason, and a no error reason;
- wherein the first control message includes a first payload which includes the reason information.

* * * * *